United States Patent [19]
Kano

[11] Patent Number: 5,301,293
[45] Date of Patent: Apr. 5, 1994

[54] LOGIC CIRCUIT FOR SELECTING SIGNALS INDICATIVE OF OPERATING STATES OF FLOPPY DISK APPARATUS

[75] Inventor: Ikuo Kano, Hanamaki, Japan

[73] Assignee: Matsushita Electric Industrial Co., Ltd., Osaka, Japan

[21] Appl. No.: 668,175

[22] Filed: Mar. 12, 1991

[30] Foreign Application Priority Data

Mar. 16, 1990 [JP] Japan ................................. 2-67735

[51] Int. Cl.$^5$ ............................................. G11B 33/10
[52] U.S. Cl. ..................................... 395/425; 360/69; 340/635
[58] Field of Search ............... 395/400, 425; 360/69; 340/635

[56] References Cited

U.S. PATENT DOCUMENTS 4,940,969 7/1990 Taylor ................................. 340/635

OTHER PUBLICATIONS

Mano, *Computer System Architecture*, 1982, pp. 308–311.
Millman, *Microelectronics*, 1979, pp. 186–187 & 215.

*Primary Examiner*—David L. Robertson
*Attorney, Agent, or Firm*—Stevens, Davis, Miller & Mosher

[57] ABSTRACT

A logic signal selection setting apparatus for facilitating verification and change of set states of various logic signal selection modes in a floppy disk apparatus comprises a memory of which data can be rewritten at a given time, a signal generating circuit for generating a signal for reading at a predetermined time the data written in the memory at the given time, and a shift register supplied at an input with the data read out from the memory at the time generated by the read signal generating circuit to thereby set up a signal selection mode for selecting an interface output signal of a logic circuit or a signal for lighting a light emission element for displaying the in-service state of the apparatus. The data stored in the memory is read out at the time generated by the memory read signal generating circuit to be input to the shift register thereby to allow the shift register to set the selection signal for the selector circuit to select the interface output signal or an LED lighting signal indicating the in-service state of the floppy disk apparatus.

7 Claims, 3 Drawing Sheets

LOGIC CIRCUIT FOR SELECTING SIGNALS INDICATIVE OF OPERATING STATES OF FLOPPY DISK APPARATUS

BACKGROUND OF THE INVENTION

The present invention relates to a floppy disk apparatus (also known as floppy disk drive) used in information processing systems and others.

Control of a floppy disk loaded in the floppy disk drive or apparatus known heretofore is performed by a random logic which uses a gate array to provide functions which can be programmed either during manufacture or in the field. In the case of the former, the setting of signal selection for the logic processing can be optionally changed by using a switch or by connecting a chip resistor or the like measures.

FIG. 3 of the accompanying drawings is a block diagram showing a hitherto known logic circuit designated for changing the signal selection by using a switch. In this figure, a reference numeral 1 denotes a switch having one end connected to the ground and the other end which is connected to a second input terminal of an AND gate 2 and a second input terminal of another AND gate 4 through an inverter 3, and a numeral 5 denotes a resistor connected between the input of the inverter 3 and a power supply of +5 volts.

Applied to the first input terminal of the AND gate 2 is a ready signal, while applied to a first input terminal of the AND gate 4 is a disk-in signal.

A reference numeral 6 denotes an OR gate which serves to select either the ready signal output from the AND gate 2 or the disk-in signal output from the AND gate 4 to thereby produce the selected signal as an interface output signal. AND gates 2 and 4 and OR gate 6 together form a multiplexer.

In operation of the logic circuit shown in FIG. 3, when the switch 1 is closed thereby to form a short-circuit to the ground, the level at the input terminal of the inverter 3 becomes low, which results in a high level at the second input terminal of the AND gate 4. When the disk-in signal is applied to the first input terminal of the AND gate 4 in this state, the disk-in signal is selected by the OR gate 6 to be output as the interface output signal.

The disk-in signal is a signal which informs a host system of the state in which a medium or a floppy disk has been inserted in the floppy disk drive.

When the switch 1 is opened, the high level makes appearance at the second input terminal of the AND gate 2, while the level appearing at the second input of the AND gate 4 becomes low. Accordingly, when the ready signal is applied to the first input terminal of the AND gate 2 in this state, the ready signal is selected by the OR gate 6 to be output as the interface output signal.

This ready signal is used to inform the host system of the state in which the medium or disk has been placed in the floppy disk apparatus with a spindle motor rotating at a constant speed and thus the floppy disk apparatus is now ready for a read/write operation.

FIG. 4 of the accompanying drawings is a block diagram showing a hitherto known logic circuit which is arranged to change the signal selection by selectively demounting a chip resistor. In FIG. 4, like parts or elements as those shown in FIG. 3 are denoted by like reference numerals. The following description will be directed to those parts which differ from those of the logic circuit shown in FIG. 3.

Referring to FIG. 4, a reference numeral 7 denotes a chip resistor which is connected between terminals 8b and 8c of a printed circuit substrate (not shown), wherein the terminal 8a is connected to a power supply of +5 volts while the terminal 8c is connected to the ground.

A numeral 9 denotes a light emission diode which is mounted on a front panel of a floppy disk drive or apparatus for indicating that the apparatus is in an in-service state, when it is lit. The light emission diode 9 is energized in response to an in-use interface signal. A numeral 10 denotes a resistor of 270 Ω connected between the light emission diode 9 and the power supply of +5 volts.

Description will be made of operation of the prior art logic circuit shown in FIG. 4. Because of the chip resistor 7 inserted between the terminals 8b and 8c, both the input terminal of the inverter 3 and the second input terminal of the AND gate 2 assume a low level while the second input terminal of the AND gate 4 assumes a high level.

Accordingly, the in-use signal applied to the first input terminal of the AND gate 4 is selected by the OR gate 6 to be output as the interface output signal, which results in lighting of the light emission diode 9 indicating that the floppy disk apparatus is now being used.

On the other hand, when the chip resistor 7 is positioned between the terminal 8a and the terminal 8b, the second input terminal of the AND gate 2 assumes a high level with the second input of the AND gate 4 being at low level.

Accordingly, when a drive select signal is applied to the first input terminal of the AND gate 2 in this state, the drive select signal is selected by the OR gate 6 thereby to energize the light emission diode 9.

The in-use signal mentioned above serves to energize the light emission diode 9 indicating that the floppy disk apparatus is being used. On the other hand, the drive select signal is used for indicating that the floppy disk apparatus is selected by the host system to which it is connected.

As is apparent from the above, in the case of the prior art logic circuit shown in FIG. 3, the switch must be correspondingly turned on/off when it is desired to change the signal selection of the logic circuit.

On the other hand, in the case of the prior art logic circuit shown in FIG. 4, the chip resistor 7 has to be mounted or remounted by brazing when the signal selection of the logic circuit is to be changed. Accordingly, in order to verify the operation of the printed circuit set at a particular signal selection mode, it is necessary to visually verify whether the part of concern is actually mounted or positioned properly or to determine the signal selection mode.

Further, in both the logic circuits shown in FIGS. 3 and 4, difficulty will be encountered in performing inspection and adjustment of the floppy disk apparatus set at different signal selection modes while making verification in the course of manufacturing process.

SUMMARY OF THE INVENTION

It is therefore an object of the present invention to solve the problems of the prior art logic circuits described above and provide an improved floppy disk apparatus which allows the signal selection to be easily verified and/or changed.

In view of the above and other objects which will be apparent as description proceeds, there is provided according to a general aspect of the invention a floppy disk apparatus which comprises a memory of which data can be rewritten at a desired time, a read time generating circuit for generating a signal for reading at a predetermined time the data written arbitrarily in the memory, and a shift register supplied at an input with the data read out from the memory thereby to set up a signal selection mode for selecting an interface output signal of a logic circuit or a signal for lighting a light emission element for displaying the in-service state of the apparatus, wherein the data stored in the memory is read out in response to a signal generated by the memory read time generating circuit to be input to the shift register thereby to allow the shift register to set the signal selection signal for a multiplexer to select the interface output signal or the lighting signal indicating the in-service state of the apparatus.

Thus, according to the teachings of the present invention that data is written in the memory at a given time while the shift register reads the data from the memory to output the select signal, the signal selection can be set up or established arbitrarily without need for the use of the chip resistor and the switch for setting the signal selection. Further, the state of the signal selection set in the logic can be verified by reading out the content from the memory as occasion requires. Besides, even the floppy disk apparatuses set at different signal selections can appropriately be tested and adjusted on one and the same manufacturing line on the basis of the data stored in the memory. Additionally, the signal selection can readily be altered simply by rewriting the content of the memory.

DESCRIPTION OF THE PREFERRED EMBODIMENTS

Figure 1:
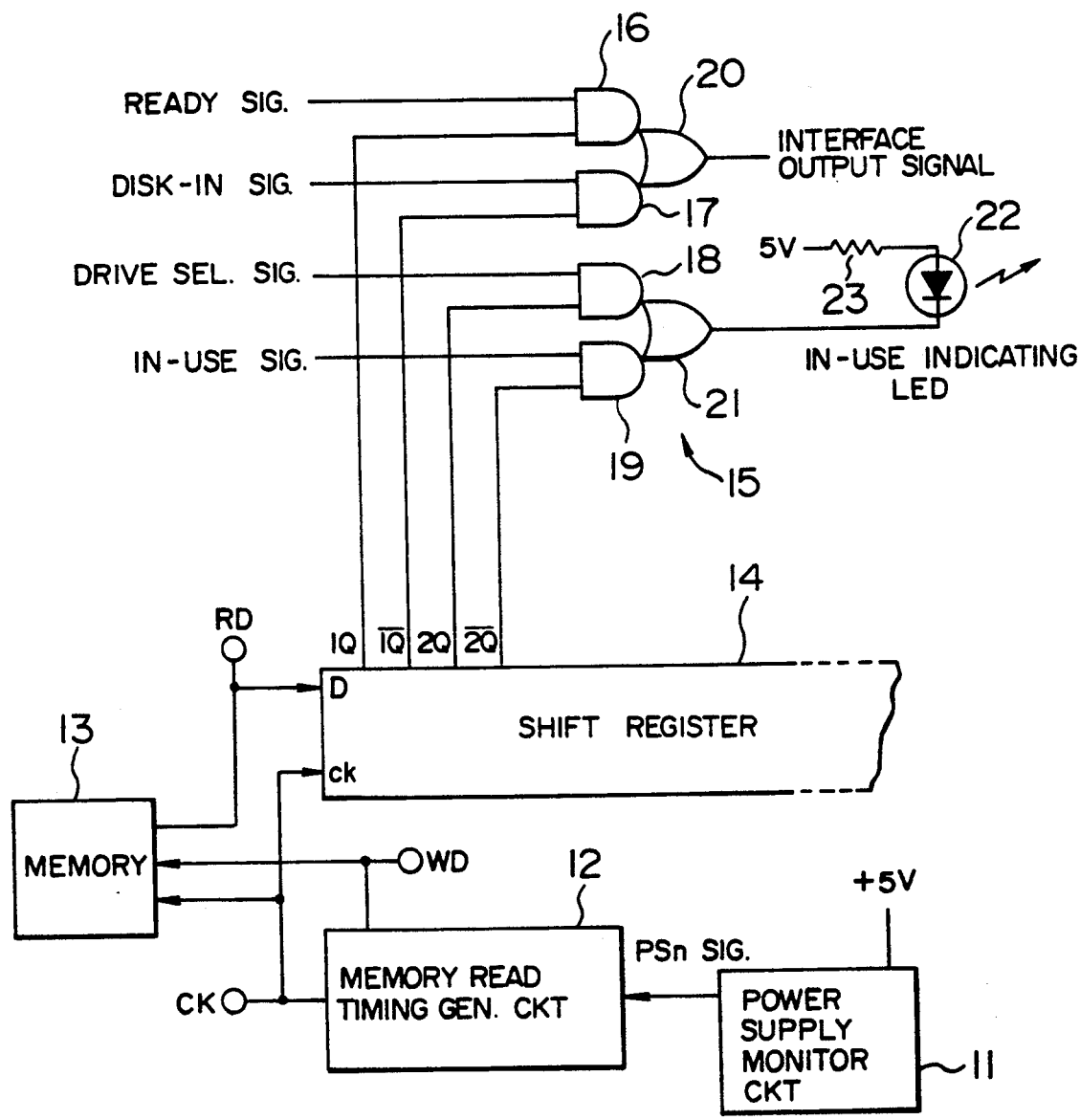
FIG. 1 is a block diagram showing schematically a general arrangement of the floppy disk apparatus according to an exemplary or preferred embodiment of the invention.

FIG. 1 is a schematic circuit diagram showing a structure of the floppy disk apparatus according to an embodiment of the invention. In this figure, a reference numeral 11 denotes a power supply monitor circuit which is so designed as to generate a low level pulse PSn in response a surge of a power supply voltage of the floppy disk apparatus.

A numeral 12 denotes a memory read timing generating circuit which is designed to respond to the low level pulse signal PSn generated by the power supply monitor circuit 11 by generating a read signal for reading out data from a rewritable memory 13 while issuing a read command to the memory 13 together with an address designating signal.

A numeral 14 denotes a shift register for fetching the data from the memory 13. The data or information placed in this shift register 14 is used as a setting signal for setting up the signal selection mode for a logic circuit comprising multiplexers and generally denoted by a reference numeral 15.

Reference numerals 16 to 19 denote AND gates having second input terminals which are supplied with the data from output terminals 1Q, 1$\overline{Q}$, 2Q and 2$\overline{Q}$ of the shift register 14, respectively, as signal selection setting signals for setting up the timing of the logic circuit 15.

The AND gates 16 to 19 have respective first input terminals for receiving a ready signal, a disk-in signal, a drive select signal and an in-use signal, respectively.

A reference numeral 20 denotes OR gate for selecting one of the ready signal and the disk-in signal output from the AND gates 16 and 17, respectively, the selected signal being output as an interface output signal. A numeral 21 denotes another OR gate for selecting one of the drive select signal and the in-use signal output from the AND gates 18 and 19, respectively, wherein the selected signal is used for lighting the light emission diode 22 to produce an in-service indication. AND gates 16 and 17 and OR gate 20 form a multiplexer, as do AND gates 18 and 19 and OR gate 21.

A reference numeral 23 denotes a resistor inserted between the light emission diode 22 and a power supply of +5 V.

Further, reference symbol CK designates a terminal through which a clock signal is input to a clock terminals ck of the memory read time generation circuit 12 and the shift register 14, symbol WD designates a write terminal through which data is written in the memory 13, and symbol RD designates a read terminal through which the data read out from the memory 13 is taken out to be supplied to a terminal D of the shift register 14.

Figure 2:
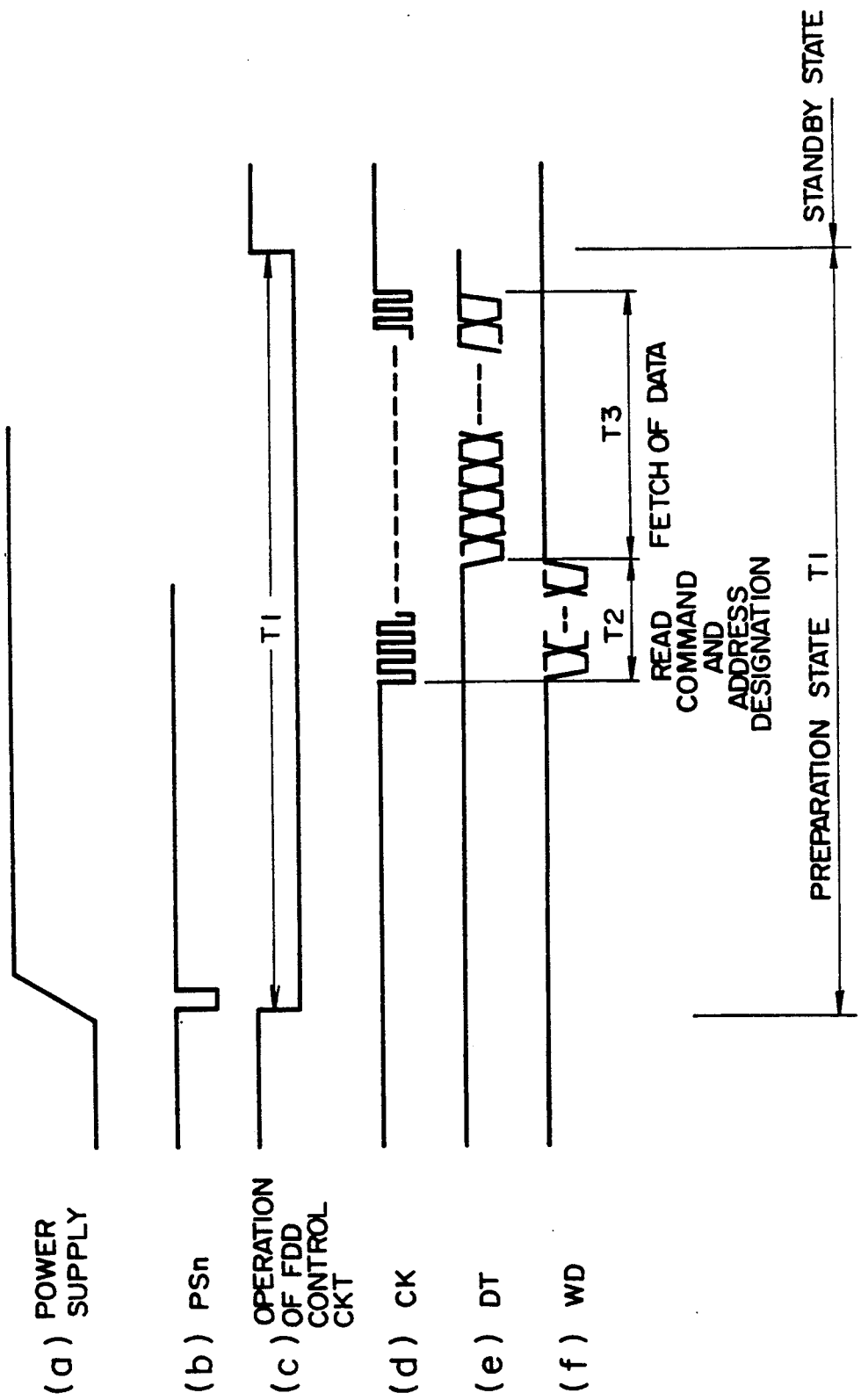
FIG. 2 is a timing chart for illustrating memory reading and signal selecting operations performed in the floppy disk apparatus shown in FIG. 1.
Figure 3:
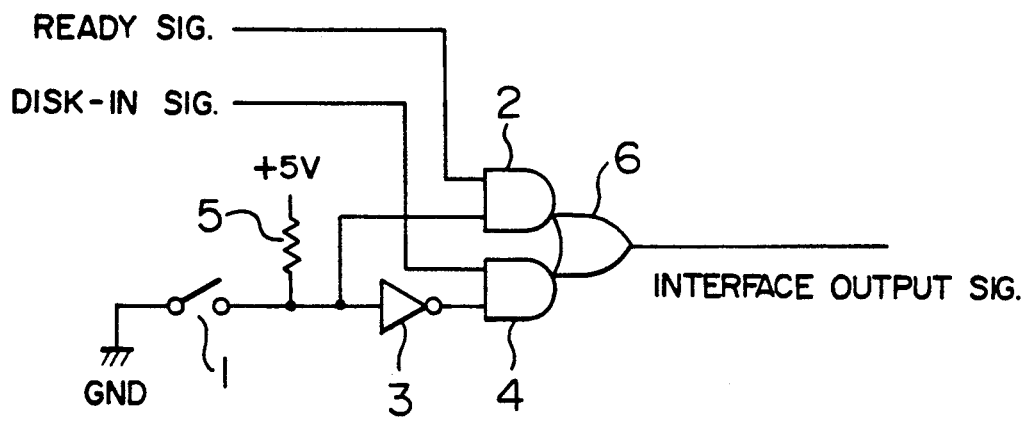
FIGS. 3 and 4 are circuit diagrams of logic circuits for controlling signal selecting in hitherto known floppy disk apparatuses.
Figure 4:
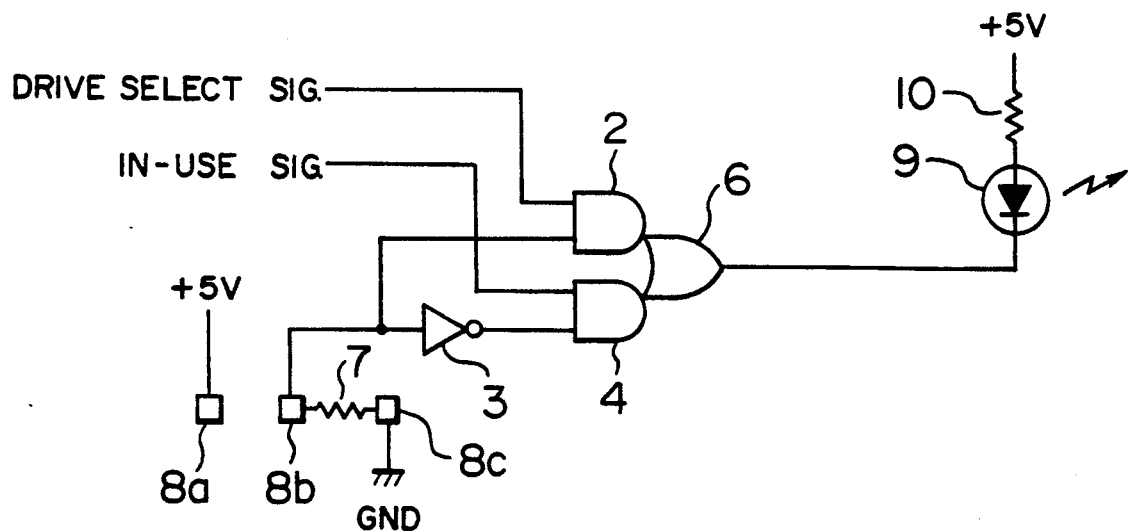

Next, description will be turned to operation of the illustrated floppy disk apparatus by reference to a time chart shown in FIG. 2.

At first, power supply is turned on before the operation of the floppy disk apparatus can be started, as shown in FIG. 2 at (a). At this time point, the PSn signal of low level is generated by the power supply monitor circuit 11, as shown in FIG. 2 at (b), to be input to the memory read time generation circuit 12, as shown in FIG. 2 at (b).

For a predetermined time period $T_1$ after the generation of the PSn signal, the drive control circuit (FDD) of the floppy disk apparatus is held in the reset state (referred to as the preparation state) except for the circuitries partaking in the memory read out operation, as shown in FIG. 2 at (c). In this state, the floppy disk apparatus is disabled from receiving any signals coming from the host system side.

Within the time span $T_1$ during which the floppy disk apparatus remains in the preparation state, (FIG. 2, (c)), the memory read time generation circuit 12 is set to its operating state in response to the input PSn signal to count the clock pulse applied to the clock terminal ck to generate the memory read time signal, as shown in FIG. 2 at (d).

During a time period $T_2$ shown in FIG. 2 at (f), a read command is issued to the memory 13 along with designation of the address. Upon lapse of the time $T_2$, the data written in the memory 13 is read out, as shown in FIG. 2 at (e), to be applied to the terminal D of the shift register via the read-out terminal RD in accordance with the clock signal, whereby the signal selection signals for the control circuit 15 for setting the multiplexers are output from the output terminals 1Q, 1$\overline{Q}$, 2Q and 2$\overline{Q}$ of the shift register 14.

When the output signal of the output terminal 1Q is at a high level, the ready signal is output from the AND gate 16 to be selected by the OR gate 20 and output therefrom as the interface output signal.

On the other hand, when the output from the terminal 1Q of the shift register 14 is at a low level, the output from the terminal 1Q̄ of the shift register 14 assumes a high level. Consequently, the disk-in signal is output from the AND gate 17 at this time, and the disk-in signal is then selected by the OR gate 20 to be output as the interface output signal.

In a similar manner, when the output levels of the output terminals 2Q and 2Q̄ of the shift register 14 become high, the drive select signal and the in-use signal are output from the AND gates 18 and 19, respectively, which are then selected by the OR gate 21 for lighting the light emission diode 22 for producing the in-service indication.

As will be appreciated from the above description, by changing the data written in the memory 13 and inputting the data read out from the memory 13 to the shift register 14, the output of the latter can be utilized as the signals for controlling the selecting operation of the OR gates 20 and 21.

Upon lapse of a time period $T_3$ taken for reading the data from the memory 13, i.e. upon lapse of the aforementioned time period $T_1$, as shown in FIG. 2 at (c), the floppy disk apparatus assumes a standby state ready for operating in response to a signal from the host system.

By connecting a tester for writing data in the memory 13 to the clock terminal CK, the read terminal RD and the write terminal WD, a read/write operation for reading and writing contents from and in the memory 13 can be carried out.

As will now be appreciated from the foregoing description, because data is written in the memory at a given time with the content of the memory being read out from the memory at a predetermined time generated by the memory read time generating circuit, wherein the content of the memory as read out is input to the shift register from which the enable signal for the multiplexers is output to the logic circuit as a given signal selection mode, it is possible to spare the switch and the chip resistor in the electric circuit while the signal selection mode once set can readily be altered or changed when occasion requires.

Further, by reading the information from the memory, the state of the logic as set can be verified, which in turn means that maintenance as well as management of adjustment and inspection can be effectuated with improved efficiency, to another advantage.

I claim:

1. A floppy disk apparatus, comprising:
a memory comprising means for rewriting said memory at a desired time with data relating to an operating state of said floppy disk apparatus;
a memory read signal generation circuit for generating a read signal for reading said memory in response to an application of power to said floppy disk apparatus;
a shift register for fetching the data of said memory which is read out in response to said read signal and for generating a control signal in accordance with said data; and
a logic circuit externally supplied with a disk-in signal indicating that a recording medium is placed in said floppy disk apparatus, a ready signal indicating that said floppy disk apparatus is in a state ready for read-write operation, a drive selection signal indicating that a host system to which said floppy disk apparatus is connected is selecting said floppy disk apparatus, and an in-use signal indicating that said floppy disk apparatus is being used, said logic circuit also being supplied with the control signal from said shift register for (i) selecting in accordance with the control signal either the ready signal or the disk-in signal and (ii) selecting in accordance with the control signal either the drive selection signal or the in-use signal, a selected one of the drive selection signal and the in-use signal being operative to light a light emission element to indicate that said floppy disk apparatus is being used.

2. A floppy disk apparatus as in claim 1, wherein said logic circuit comprises:
a first multiplexer for selecting in accordance with said control signal either the ready signal or the disk-in signal; and
a second multiplexer for selecting in accordance with said control signal either the drive selection signal or the in-use signal.

3. A floppy disk apparatus as in claim 2, wherein:
said first multiplexer comprises a first AND gate, a second AND gate, and a first OR gate receiving outputs from said first AND gate and said second AND gate; and
said second multiplexer comprises a third AND gate, a fourth AND gate, and a second OR gate receiving outputs from said third AND gate and said fourth AND gate.

4. A floppy disk apparatus as in claim 3, wherein:
said control signal comprises a first output, a second output, a third output, and a fourth output;
said first AND gate receives said first output and said ready signal;
said second AND gate receives said second output and said disk-in signal;
said third AND gate receives said third output and said drive selection signal; and
said fourth AND gate receives said fourth output and said in-use signal;
whereby said first multiplexer selects said disk-in signal or said ready signal in accordance with said first output and said second output, and whereby said second multiplexer selects said drive selection signal or said in-use signal in accordance with said third output and said fourth output.

5. A floppy disk apparatus as in claim 4, wherein said shift register comprises a first output terminal for outputting said first output, a second output terminal for outputting said second output, a third output terminal for outputting said third output, and a fourth output terminal for outputting said fourth output.

6. A floppy disk apparatus receiving apparatus operation indicating signals supplied externally and selectively applying said apparatus operation indicating signals to a host computer and to an operation indicating device, said apparatus comprising:
memory means for storing data for controlling times of application of said apparatus operation indicating signals, said memory means comprising means for rewriting at any desired time said data stored in said memory means to change said times of said application;
a memory read signal generation circuit for generating a read signal for reading said memory means in response to an application of power to said apparatus;

a shift register for fetching said data stored in said memory which is read out in response to said read signal and for generating a control signal in accordance with said data; and a logic circuit for receiving said control signal from said shift register and for receiving said apparatus operation indicating signals, said logic circuit being adapted to apply selectively said apparatus operation indicating signals to said host computer and to said operation indicating device at times indicated by said control signal and predetermined by said data stored in said memory means.

7. A floppy disk apparatus as in claim 6, further comprising means for applying a clock signal to operate synchronously said memory means, said shift register and said logic circuit.

* * * * *